Nov. 10, 1931.  E. L. KRAFT  1,831,498
WINDSHIELD VENTILATOR
Filed Jan. 18, 1929
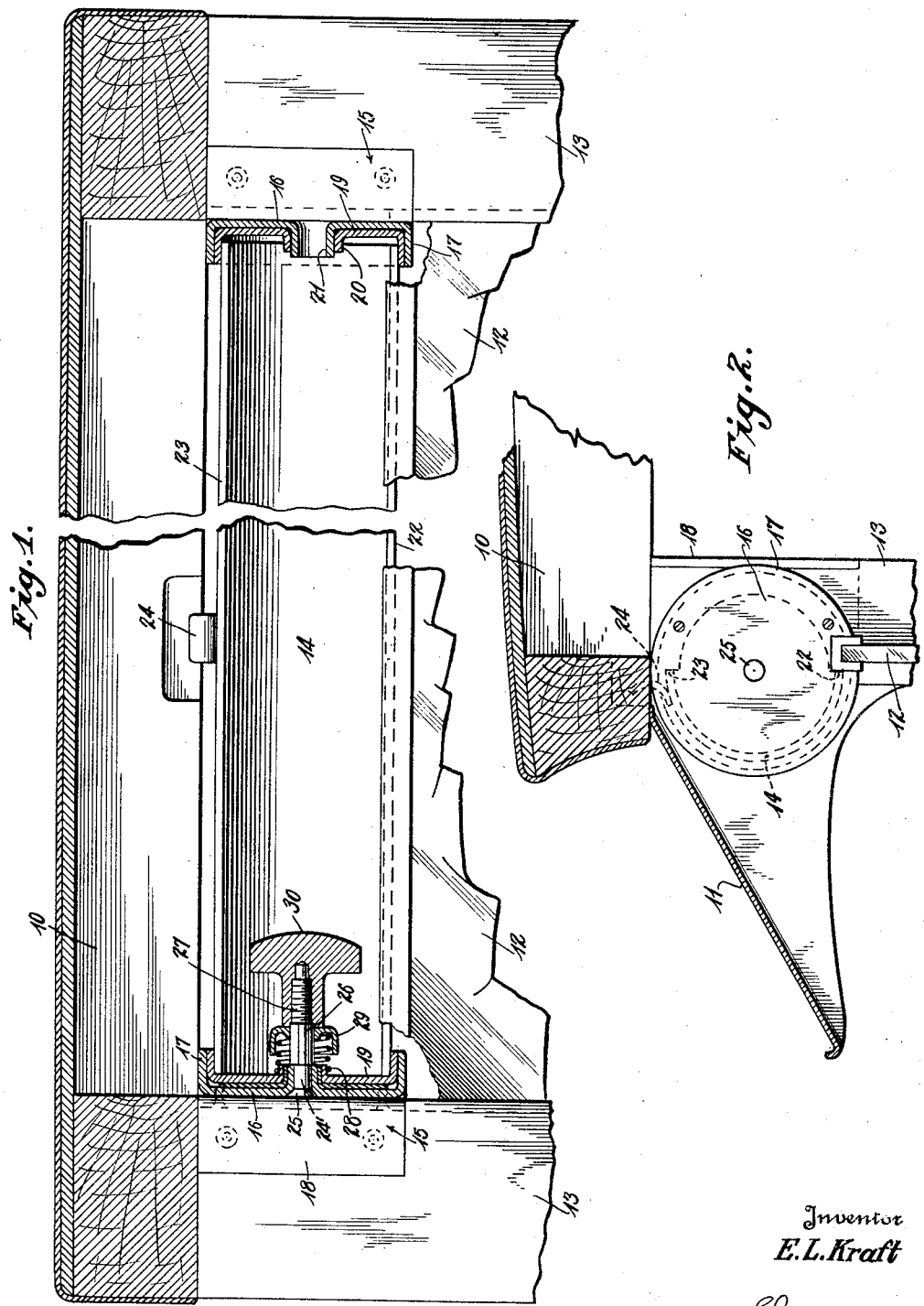

Patented Nov. 10, 1931

1,831,498

UNITED STATES PATENT OFFICE

EDWARD L. KRAFT, OF YORK, PENNSYLVANIA, ASSIGNOR TO MARTIN-PARRY CORPORATION, OF YORK, PENNSYLVANIA, A CORPORATION OF DELAWARE

WINDSHIELD VENTILATOR

Application filed January 18, 1929. Serial No. 333,251.

This invention relates to windshield ventilators, and more particularly to the type adapted for use on automobiles having closed bodies, such as sedans, coupés, and the like. The principal object of the invention is to simplify and improve devices of this character, to render them simple and efficient in construction and operation, and not liable to get out of order.

Another object of the invention is to provide friction means for holding the ventilator in desired positions of adjustment.

Still another object of invention is to provide an improved tensioning device for the friction means.

Other objects and features of novelty will be apparent as the following description proceeds, as taken in conjunction with the accompanying drawings, in which Fig. 1 is a partial section through the upper portion of a closed car body, showing the improved ventilator in section;

Fig. 2 is an elevation, partly in section, of the device as it appears from the interior of the body.

Referring more particularly to the drawings, the ventilator is illustrated in connection with a portion of the body of a closed car, having a roof 10, a visor 11, a windshield 12 and a corner post 13. The windshield 12 terminates below the roof 10, leaving a rectangular opening in which the ventilator indicated generally at 15, is mounted.

Secured to the corner post above the windshield are a pair of brackets 15, one for each side of the car. Each bracket has an upstanding flange 16, which projects both inwardly and outwardly with respect to the windshield, and provided with a circular rim 17, thus forming a flat bottomed cup-like bracket to receive the ventilator. The bracket 15 comprises a flat flange 18, drilled or otherwise provided with holes to receive screws or other fastening means by which it may be rigidly secured to the corner post or other frame-work of the closed car.

The ventilator comprises a semicircular trough-like member of sheet metal or other desired material, the open ends of which are enclosed, as by means of a brass ferrule 19. This ferrule is adapted to lie snugly within the rim 17, and is provided with a central boss 20, which is rotatably mounted upon a similar but smaller hollow boss 21 which projects inwardly from the center of the corresponding flange 16.

Referring to Fig. 1, it will be noted that when the ventilator is in the closed position, the inner edge 22 of the ventilator abuts against the top of the windshield 12, whereas the upper edge 23 of the ventilator is adjacent to the roof 10, and as the rim 17 prevents entrance of air at the end of the trough-like member, the ventilation may be totally cut off if desired. An operating handle 24 is provided for the ventilator, by means of which it may be rotated about bosses 21. When the edge 23 is rotated inward, the edge 22 will be moved outward away from the windshield 12, and further rotation will increase the size of the ventilation opening. The cylindrical contour of the inner surface of the ventilator will tend to deflect the incoming air, and to distribute it throughout the body of the automobile.

To retain the ventilator in desired positions of adjustment, an improved friction means has been provided, together with a novel tensioning means therefor. A stem 24' projects through one of the bosses 21, and is provided with a head 25, a squared portion 26, and a threaded end 27. A helical coil spring 28 surrounds the squared portion 26 as well as the boss 20 of the ferrule 19 which forms a seat for the inner end thereof. The outer end of the spring 28 is contained by a cap 29 having a rectangular opening to permit it to pass over the squared portion 26. A thumb screw 30 is provided with a threaded internal bore adapted to encase the threaded end 27 and project thereover to engage the cap 29. By means of the thumb screw 30, the pressure exerted by the spring 28 may be adjusted as desired, thus regulating the pressure between the ferrule 19 and the flange 16. A member having a friction surface is interposed between these two elements, and in the present embodiment of the invention I have shown brass washers for this purpose as shown at 31, but obviously other materials would serve for this purpose.

It should be readily apparent that by adjustment of the thumb screw 30 the friction between the ventilator and the bracket may be readily adjusted so that the ventilator may be easily moved to any desired position, and that the ventilator will stay in this adjusted position until again adjusted.

While one embodiment of the invention has been shown and described in great detail for the purposes of adequate disclosure, the invention is not limited to the specific details disclosed, but includes such modifications and embodiments of the broad idea as come within the scope of the appended claims.

Having thus described my invention, what I claim as new and desire to secure by Letters Patent of United States is:

1. A windshield ventilator for a closed car body having a windshield and a visor, and adapted to be mounted in an elongated horizontal opening above the windshield in back of the visor, the improvement which comprises a closure member pivoted to swing about the longitudinal axis of said opening, bracket members at each end of said opening for guiding said closure member, means interposed between said closure member and one of said bracket members for holding them in relatively adjusted positions and means coaxial with the pivot points of said closure member for tensioning said holding means.

2. In combination with a closed car body having a ventilator, a bracket mounted on said body having an upstanding flange with an annular rim, a closure member pivoted centrally of said flange and having an arcuate end guided by said rim, friction means interposed between said flange and arcuate end.

3. In combination with a closed car body having a ventilator, a bracket mounted on said body having an upstanding flange with an annular rim, a closure member pivoted centrally of said flange and having an arcuate end guided by said rim, friction means interposed between said flange and arcuate end and means for tensioning said friction means.

4. In a closed car ventilator, a bracket having an upstanding flange with an annular rim and a central boss, a closure member having an arcuate end with a boss pivoted on the first mentioned boss, and means passing through both said bosses for holding said closure member in various adjusted positions.

5. In a closed car ventilator, a bracket having an upstanding flange with an annular rim and a central boss, a closure member having an arcuate end with a boss pivoted on the first mentioned boss, and means passing through both said bosses for holding said closure member in various adjusted positions, said means comprising a bolt, a cap carried by said bolt, a thumb screw retaining said cap, and a spring interposed between said cap and said arcuate end for urging it against said flange.

6. In a closed car ventilator, a support member secured to a portion of said body, a closure member, means for pivotally mounting said closure member on said support, and means in addition to the aforementioned means carried by said support and passing through said closure member solely for retaining said support and closure member in relatively adjusted position.

7. In combination, a pair of spaced members, a windshield glass engaging said spaced members at its ends, said glass terminating at its upper edge below the upper ends of said spaced members to leave an elongated ventilating opening, a bracket positioned in each end of said opening, each bracket comprising a flange for securing it to one of said spaced members, and a cup-like portion consisting of an end wall positioned to project forwardly and rearwardly of the plane of the windshield and a rim around the edge of said end wall, and a ventilator pivotally supported on said brackets with its ends received in said cup-like portions.

In testimony whereof I affix my signature.

EDWARD L. KRAFT.